United States Patent
Neumayer et al.

(10) Patent No.: US 8,231,141 B2
(45) Date of Patent: Jul. 31, 2012

(54) GAS GENERATOR INCLUDING A MULTIFUNCTIONAL FILTER

(75) Inventors: Hans-Peter Neumayer, Ampfing (DE); Fabien Cristoforetti, Muehldorf (DE)

(73) Assignee: TRW Airbag Systems GmbH, Aschau (DE)

( * ) Notice: Subject to any disclaimer, the term of this patent is extended or adjusted under 35 U.S.C. 154(b) by 438 days.

(21) Appl. No.: 12/487,682

(22) Filed: Jun. 19, 2009

(65) Prior Publication Data

US 2009/0315307 A1   Dec. 24, 2009

(30) Foreign Application Priority Data

Jun. 23, 2008  (DE) .......................... 10 2008 029 591

(51) Int. Cl.
*B60R 21/26* (2006.01)
(52) U.S. Cl. ........................................ 280/741; 280/736
(58) Field of Classification Search .................. 280/741, 280/736; 102/530, 531
See application file for complete search history.

(56) References Cited

U.S. PATENT DOCUMENTS

| | | | | |
|---|---|---|---|---|
| 5,582,427 | A * | 12/1996 | Rink et al. | 280/740 |
| 6,065,774 | A * | 5/2000 | Cabrera | 280/741 |
| 6,257,617 | B1 | 7/2001 | McFarland et al. | |
| 6,739,621 | B2 * | 5/2004 | Parkinson et al. | 280/741 |
| 7,540,241 | B2 * | 6/2009 | Bierwirth | 102/530 |
| 2001/0013300 | A1 * | 8/2001 | Lutz et al. | 102/530 |
| 2006/0254454 | A1 * | 11/2006 | Bierwirth | 102/530 |
| 2007/0063494 | A1 * | 3/2007 | Saito et al. | 280/736 |
| 2011/0254255 | A1 * | 10/2011 | Chen et al. | 280/741 |

FOREIGN PATENT DOCUMENTS

| | | |
|---|---|---|
| DE | 4227547 | 2/1994 |
| DE | 202004001017 | 7/2004 |
| EP | 0751048 | 1/1997 |
| WO | 2005049374 | 6/2005 |

* cited by examiner

*Primary Examiner* — Drew Brown
(74) *Attorney, Agent, or Firm* — Tarolli, Sundheim, Covell & Tummino LLP

(57) ABSTRACT

The invention relates to a gas generator (10) for use in a safety device for motor vehicles comprising a housing and a propellant (4) contained in a combustion chamber (25) of the housing for generating a pressurized gas, the housing comprising a first housing part (40) and a second housing part (30) at least partly surrounded by the first housing part (40) and at least one igniter (6) for igniting the propellant (4), and an annular filter (50) surrounding the combustion chamber (25) in which the propellant (4) is located. The filter (50) comprises a peripheral portion (52) and a radial portion (51), the radial portion (51) serving as filling body for the propellant (4) in the combustion chamber (25).

11 Claims, 4 Drawing Sheets

GAS GENERATOR INCLUDING A MULTIFUNCTIONAL FILTER

FIELD OF THE INVENTION

The present invention relates to a gas generator for use in a safety device for motor vehicles comprising a housing and a propellant contained in a combustion chamber of the housing for generating a pressurized gas, the housing comprising a first housing part including a cover portion and a second housing part at least partly surrounded by the first housing part, and at least one igniter for igniting the propellant.

BACKGROUND OF THE INVENTION

Generic gas generators according to the present invention are described, for instance, in the DE 20 2004 001 017 U1 and are used e.g. in vehicle occupant restraint systems for inflation of airbags or activation of seat belt tensioners. They are preferably employed as driver-side generators and often are in the shape of a toroid. If a sensor detects presence of unusual acceleration values or a crash, a propellant is ignited in the gas generator releasing a pressurized gas. Due to the pressure of the released gas a gas flow is directed outwardly through outflow openings provided in the housing and is directed, for instance, into an air bag which inflates. So as to prevent undesired discharge of the particles produced during combustion, a filter is installed inside the gas generator between the combustion chamber where the propellant is ignited and the outflow openings of the housing. The filter prevents the aforesaid discharge through the outflow openings and simultaneously serves as heat sink.

SUMMARY OF THE INVENTION

It is an object of the present invention to optimize the manufacturing process of the gas generator and the gas generator of the type describe above.

In a gas generator according to the present invention this object is achieved by providing an annular filter surrounding the combustion chamber in which the propellant is located and by the fact that the filter includes a peripheral and a radial portion, the radial portion serving as filling body for the propellant in the combustion chamber. Whereas filters known in the art merely serve as retaining means for combustion products (slag, particles) and as heat sink, the inventive gas generator includes a multifunctional filter fulfilling an additional function as filling body for the propellant. A filling body for the propellant is typically needed if the propellant is present in the form of pellets (in random fill) which are moved relative to each other and may produce rattling noises upon movement of the vehicle or of the gas generator. Moreover, due to their relative movement the pellets may in the course of time be subject to abrasion or be pulverized completely which could adversely affect ignition and combustion behavior of the propellant. Hence, filling bodies are inserted for holding the pellets in place. The present invention now relates to a gas generator which, instead of containing two separate components, namely a filling body and a filter for retaining the discharge during combustion, uses a modified integrally formed filter fulfilling both functions. In the context of the present invention, integrally formed means that the portions of the filter are connected to each other such that a single continuous filter is obtained. The radial portion of the filter pre-stresses the pellets of the propellant in the axial direction to inhibit movement thereof.

According to an aspect of the present invention, the filter advantageously comprises portions of different compressibility. Preferably, the peripheral portion which typically serves to retain the discharge and acts as heat sink has a lower compressibility than the radial portion of the filter. In other words, the filter may have a lower density in the radial portion resting against the upper housing shell (cover) than in the peripheral portion peripherally surrounding the combustion chamber. For instance, the knitted mesh of the filter in the radial portion can be processed differently from that of the peripheral portion.

Due to different compressibility or density, the radial portion can exert an elastic force, for instance, on the pellets of the propellant, thus continuously holding them in place while the peripheral portion mainly fulfills the usual retaining function.

Preferably, the radial portion may be constructed to serve as distance element for positioning an axially movable component of the gas generator. Inside the gas generator there are typically additional components such as the igniter which can be arranged in an inner housing part. As specified in the invention, the filter may now fulfill further additional functions. In addition to its retaining effect during combustion, its heat sink effect and its function as filling body for the propellant, the filter additionally also fulfills a function as distance element for positioning components inside the gas generator.

Apart from axially positioning or holding in place movable components, a radial positioning of moveable components is also possible. For this purpose, in particular the radial portion of the filter may, for instance, be constructed with different thicknesses.

The radial portion is preferably constructed to serve as distance element and/or spring element for positioning an ignition mixing sleeve. This is advantageous in gas generators where the ignition mixing sleeve is placed over the igniter but remains movable in the axial direction. If the radial portion of the inventive filter is placed over the ignition mixing sleeve, the filter can continuously hold the ignition mixing sleeve in a fixed position in the axial direction i.e. push it away from the upper housing part.

Thus, an elastic force action of the radial portion of the inventive filter can preferably be used for holding the ignition mixing sleeve in place. According to a further advantageous aspect of the invention, an elastic force action of the radial portion of the filter may also be used for pressing the components of the housing against each other in a way that the housing is sealingly closed. This is particularly advantageous if the housing includes an upper and a lower housing shell and if an additional housing part also referred to as ignition flange is inserted into the lower housing shell. Typically, the inner housing part will rest against the lower housing part or lower housing shell. The inventive filter, in particular the radial portion of the filter, may be constructed to exert a force on the inner housing part such that the latter is pressed onto the lower housing part, thus contributing to the seal effect.

The present invention also relates to a manufacturing process of a gas generator for use in a safety device for motor vehicles. The gas generator includes a combustion chamber for the propellant as well as a filter provided for retaining combustion products of the propellant. This filter comprises a first and a second portion. According to the inventive manufacturing process, the filter is first placed into a lower housing part of the gas generator such that, in the axial direction, the second portion of the filter extends beyond the combustion chamber of the gas generator. Then, the propellant (for instance, in the form of pellets) is filled into the combustion chamber of the gas generator, the second portion of the filter being used as filling aid for the propellant. Within the framework of the manufacturing process of the gas generator, the inventive filter thus additionally fulfills the function of a filling aid or fill hopper.

Advantageously, the filter is designed such that its first portion has a lower compressibility than its second portion. This can be achieved by means of different densities in the knitted mesh subsequent to pressing and by different deformation behavior of the second portion and the first portion of the inventive filter. In so far, in particular the second portion (in the fully assembled state of the gas generator referred to as radial portion) may exhibit higher elasticity or lower density and thus higher compressibility. The first portion has the low compressibility required for fulfilling its retaining effect and heat sink function.

In the inventive manufacturing process, the step of filling in the propellant is advantageously followed by a further step in which the second portion of the filter is bent in a way that it subsequently extends, at least in sections, also radially above the combustion chamber. This enables the filter to fulfill its aforementioned functions, for instance as filling body for the propellant or for positioning or holding in place components in the radial or axial direction.

Advantageously, the step of bending the second portion of the filter is done by placing an upper housing part on the lower housing part. While the upper housing part is being placed onto the lower housing part the filter is simultaneously bent and brought from its mainly upright position into the radial position.

According to a further aspect of the present invention, the upper housing part is pushed so far onto the lower housing part that the second portion is compressed and acts as filling body for the propellant. Thus, the desired function of the filter as filling body is obtained.

All in all, the multifunctional filter according to the present invention fulfills more than one function both within the framework of the manufacturing process of the gas generator and in the fully assembled gas generator. Thus, the use of additional tools or auxiliary appliances and of components for the gas generator is reduced. The manufacturing process is simplified and thus more cost-effective which also influences the costs for the gas generator.

BRIEF DESCRIPTION OF THE DRAWINGS

Further advantageous aspects of the present invention will be apparent from the following description of a preferred embodiment, with particular reference to the accompanying drawings, in which.

DESCRIPTION OF EXAMPLE EMBODIMENTS

Figure 1:
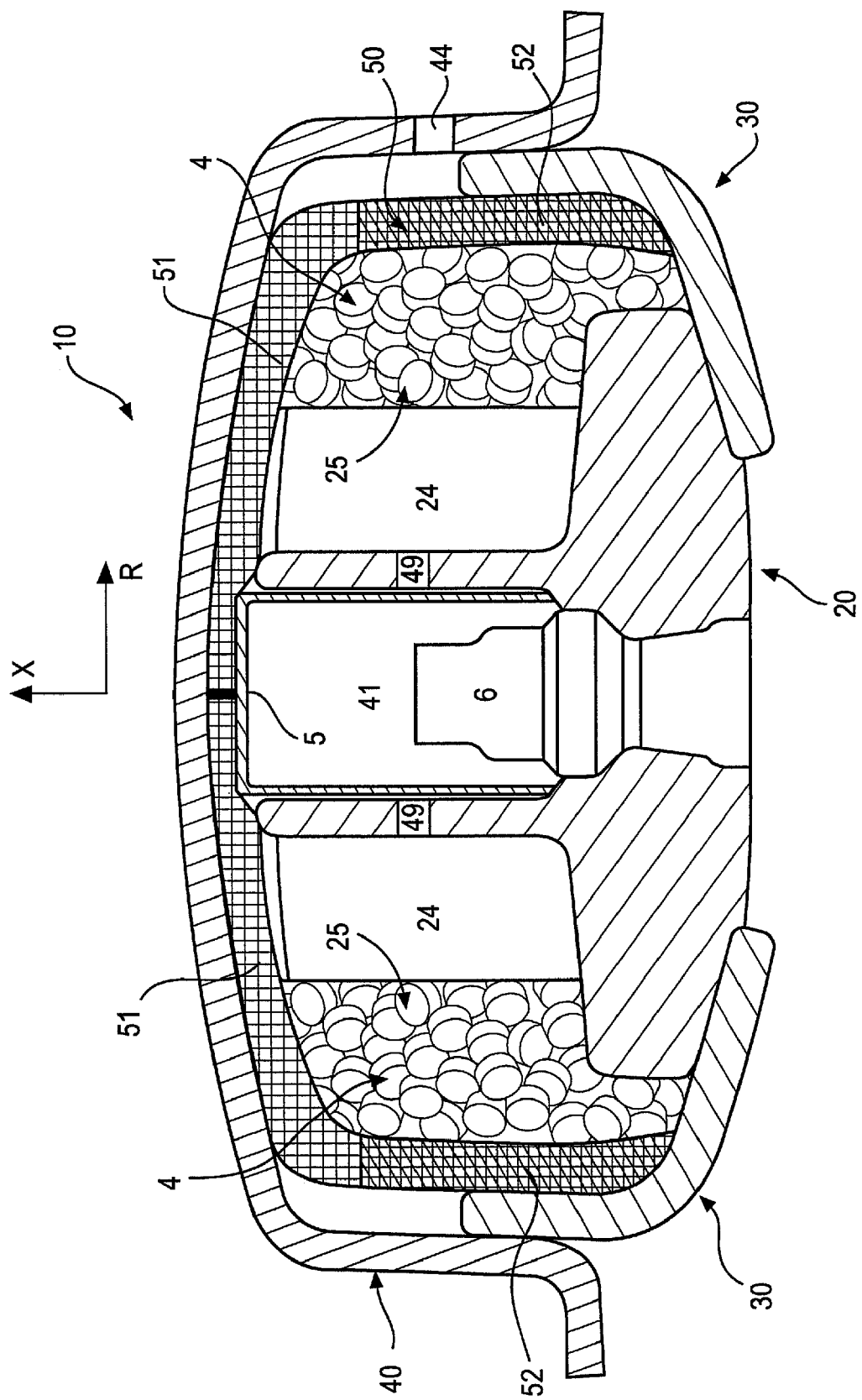
FIG. 1 shows, in simplified representation, a cross-section through an inventive gas generator according to an embodiment of the present invention.

FIG. 1 shows a cross-section through an embodiment of an inventive gas generator. Typically, the gas generator serves as driver-side generator and, in the present example, is in the shape of a toroid. Above the gas generator the axial direction is indicated by X, the radial direction by R. The gas generator 10 includes an upper housing part 40 and a lower housing part 30. An additional third housing part 20 rests against the second housing part 30 and serves to accommodate the igniter 6 as well as the ignition mixing sleeve 5 which is placed over the igniter 6 to be first movable in the axial direction. The ignition mixing sleeve 5 delimits the expansion space 41 capable of directing pressure subsequent to ignition through openings 49 into the diffusion chamber 24. Due to the diffusion chamber 24 a uniform ignition of the propellant 4 contained in the combustion chamber 25 is achieved. Propellant 4 is present in the form of so-called "pellets" in random fill.

The inventive filter 50 comprises a peripheral portion 52 and a radial portion 51. The peripheral portion essentially fulfills the conventional function of a filter and is thus constructed to prevent or reduce discharge through the outflow opening or gas exit port 44 during combustion of propellant 4. In addition, the peripheral portion 52 of filter 50 also serves as heat sink. According to the present invention, the radial portion 51 of filter 50 does not strictly and exclusively extend in the radial direction but is clearly bent relative to the peripheral portion 52 and extends more in the radial direction. For instance, it basically follows the curvature of the upper housing portion (cover) 40. The radial portion 51 of the filter 50 is designed to act as filling body for the pellets of the propellant 4, thus holding the pellets in place. The peripheral portion 52, on the other hand, is preferably stiff enough so as not to exert a pre-stressing force on the pellet fill.

In addition, it may serve as distance element for the ignition mixing sleeve 5 in the region between the upper housing part 40 and the top side of the ignition mixing sleeve 5. In this region, the radial portion 51 of the filter can be pressed between the top side of the ignition mixing sleeve 5 and the upper housing part 40. In particular, the radial portion may exert a spring force or an elastic force on the ignition mixing sleeve 5 which is otherwise movable in the axial direction.

Finally, the radial portion 51 may also fulfill the function of pressing the third housing part 20 as a whole onto the second housing part 30 to thus achieve a tight seal of the housing as a whole.

Figure 2:
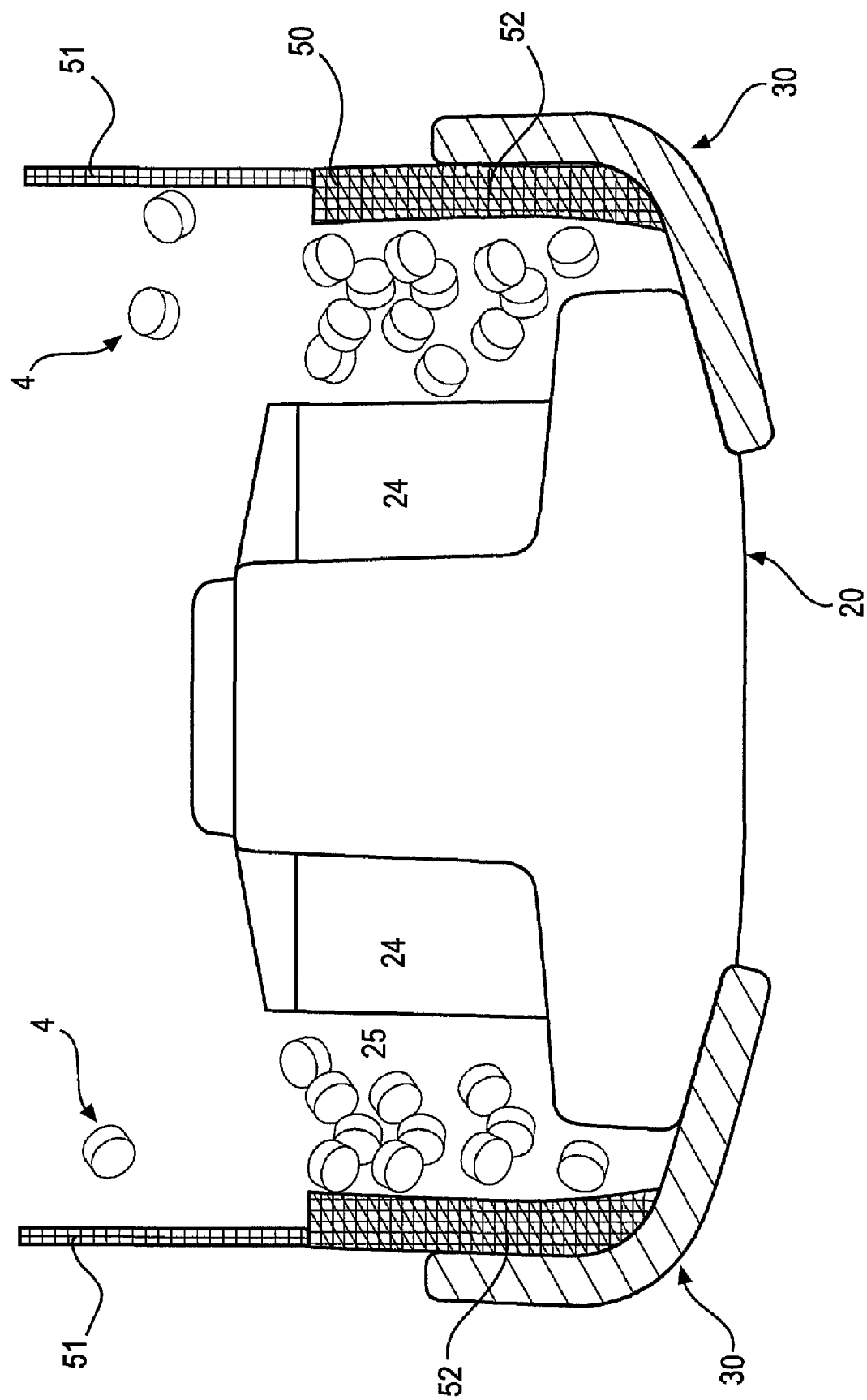
FIG. 2 shows, in simplified representation, a cross-section through the gas generator according to FIG. 1 while it is being filled with propellant.

FIG. 2 shows a cross-section through components of the gas generator according to FIG. 1 during the manufacturing process of the gas generator. First, the lower housing part 30 receives an additional third or inner housing part 20 shown here only schematically in simplified representation. Then the inventive filter 50 is placed into the lower housing part 30. The peripheral portion 52 (or also first portion) of the inventive filter 50 essentially extends in the axial direction (cf. FIG. 1 and the axis X indicated therein) approximately up to the height of combustion chamber 25. After the filter 50 has been placed into the lower housing part 30, the second portion 51 (also referred to as radial portion in the fully assembled gas generator) clearly extends beyond the combustion chamber 25 and can thus be used as filling aid or fill hopper for the pellets of propellant 4. The second portion 51 should at least project beyond the intended height of the propellant fill. Hence, already in the framework of the manufacturing process, filter 50 fulfills an additional function.

Figure 3:
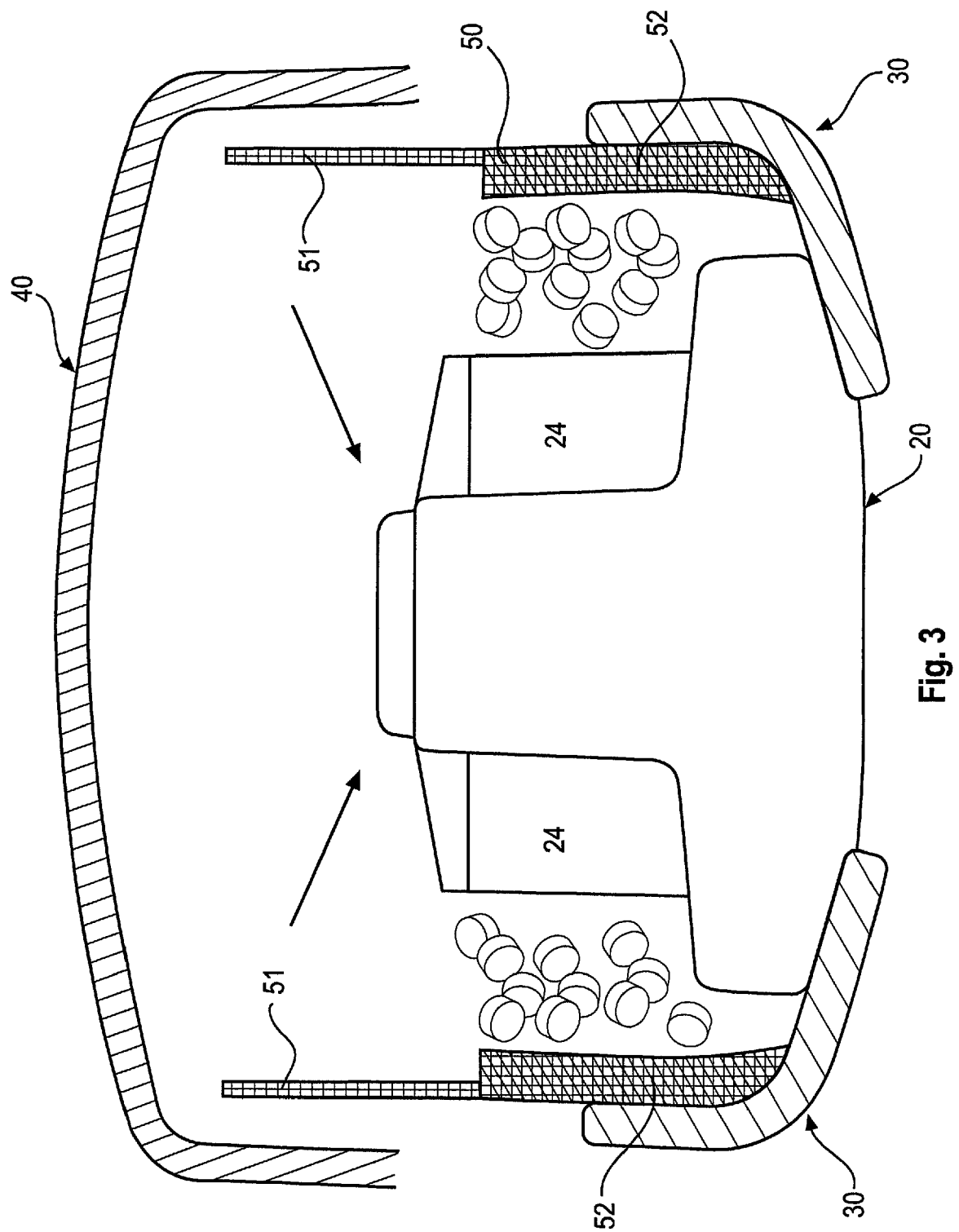
FIG. 3 shows, in simplified representation, a further cross-section through the gas generator according to FIG. 1 during a further step of the inventive manufacturing process.

FIG. 3 shows a cross-section through components of the gas generator according to FIG. 1 during a further manufacturing step. In FIG. 3 is now indicated how the upper housing part 40 is placed onto the inventive filter 50 and the lower housing part 30 including the inner housing 20. While the housing parts 30 and 40 are being brought closer together, the second portion 51 of the inventive filter 50 is gradually flexed or bent such that it subsequently extends essentially in the radial direction (cf. axis R in FIG. 1). This is indicated by the two black arrows pointing at an inclined angle inwardly and downwardly. After the housing parts 30, 40 have been connected to each other, the overall layout according to FIG. 1 results. Hence, during mounting of the upper housing part 40 (also diffusor) including the gas exit ports 44 the axial end in the form of the second portion 51 of the filter 50 is being bent radially inwardly. The second (radial) portion 51 has a lower density or higher compressibility than the base portion 52 of the filter 50.

Figure 4:
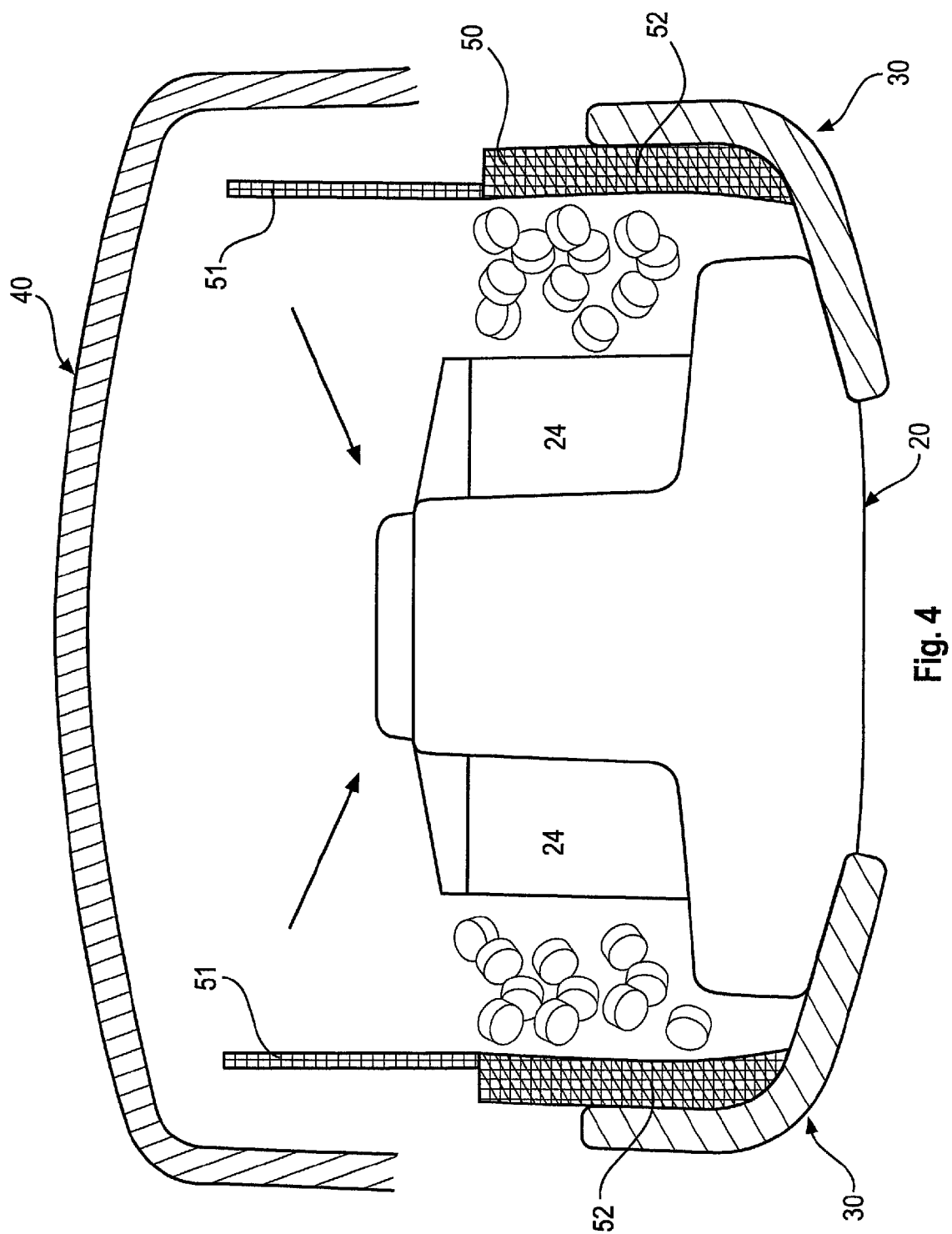
FIG. 4 shows, in simplified representation, another cross-section according to FIG. 3 in an alternative embodiment of the inventive filter.

FIG. 4 essentially corresponds to FIG. 3 but shows an alternative embodiment of filter 50. The second portion 51 of the filter is now mounted on the first portion 52 of the filter 50 at the inner circumference thereof. Depending on the properties of the filter material and the shape of the housing or the like, the variant according to FIG. 3 or FIG. 4 may be more advantageous.

In the fully assembled state corresponding to FIG. 1 the filter 50 then fulfills various functions: For one thing, it serves as filling body for the propellant 4 (i.e. an additional component acting as filling body is not necessary). In addition, the ignition mixing sleeve 5 can be held in place at the third housing part 20 (also referred to as housing), since the ignition mixing sleeve 5 is usually only placed on the inner housing part 20 and thus remains movable in the axial direction. Finally, the inventive filter 50 also serves to hold the inner housing part 20 in place relative to the second housing part 30. Thus, the inner housing part 20 is pressed into the second housing part 30 such that the counter force of the filter (in particular of the radial portion 51 of the filter 50) prevents axial movement of the inner housing part 20.

The invention claimed is:

1. A gas generator (10) for use in a safety device for motor vehicles comprising a housing and a propellant (4) contained in a combustion chamber (25) of the housing for generating a pressurized gas, said housing comprising a first housing part (40) and a second housing part (30) at least partly surrounded by said first housing part (40), an igniter (6) for igniting said propellant (4) and an annular filter (50) surrounding said combustion chamber (25) in which said propellant (4) is located, characterized in that said filter (50) has a peripheral portion (52) positioned in the combustion chamber (25) and a radial portion (51) that acts as a filling body for directing said propellant (4) into said combustion chamber (25).

2. The gas generator according to claim 1, characterized in that said peripheral portion (52) has a lower compressibility than said radial portion (51).

3. The gas generator according to claim 1, characterized in that said radial portion (51) is constructed to serve as a distance element for positioning an axially movable component of said gas generator.

4. The gas generator according to claim 1, characterized in that said radial portion (51) is constructed to radially position a movable component of said gas generator.

5. The gas generator according to claim 1, characterized in that said radial portion (51) is constructed to serve as a distance element for positioning an ignition mixing sleeve (5).

6. The gas generator according to claim 1, characterized in that said radial portion (51) is constructed to develop an elastic force action used for sealingly closing the housing.

7. The gas generator according to claim 1, characterized in that said radial portion (51) is constructed to serve as a spring element for holding said ignition mixing sleeve (5) in place.

8. A manufacturing process of a gas generator (10) for use in a safety device for motor vehicles, wherein said gas generator comprises a combustion chamber (25) for a propellant (4) and a filter (50) provided for retaining combustion products of said propellant, wherein said filter (50) includes a first portion (52) and a second portion (51) and the process comprises the steps of: Placing said filter (50) into a lower housing part (30) of said gas generator such that, in the axial direction, said second portion (51) extends beyond said combustion chamber (25) of said gas generator (10), and filling propellant (4) into said combustion chamber (25) of said gas generator (10) using said second portion (51) of said filter (50) as a filling aid, characterized in that said step of filling is followed by a step of bending said second portion (51) of said filter (50) such that, at least in sections, it also extends radially above said propellant fill.

9. The manufacturing process according to claim 8, characterized in that said first portion (52) has a lower compressibility than said second portion (51).

10. The manufacturing process according to claim 8, characterized in that said step of bending said second portion (51) of said filter (50) is done by placing an upper housing part (40) onto said lower housing part (30).

11. The manufacturing process according to claim 10, characterized in that said upper housing part (40) is pushed so far onto said lower housing part (30) that said second portion (51) is compressed and serves as a filling body for said propellant (4).

* * * * *